(12) United States Patent
Weber et al.

(10) Patent No.: US 8,451,255 B2
(45) Date of Patent: May 28, 2013

(54) METHOD OF PROVIDING TACTILE FEEDBACK AND ELECTRONIC DEVICE

(76) Inventors: Arnett Ryan Weber, Waterloo (CA);
Kuo-Feng Tong, Waterloo (CA);
Christopher James Grant, Waterloo (CA); Katarina Pavlikova, Port Moody (CA); Yingying Lu, Waterloo (CA)

( * ) Notice: Subject to any disclaimer, the term of this patent is extended or adjusted under 35 U.S.C. 154(b) by 316 days.

(21) Appl. No.: 12/780,279

(22) Filed: May 14, 2010

(65) Prior Publication Data
US 2011/0279380 A1  Nov. 17, 2011

(51) Int. Cl.
*G06F 3/041* (2006.01)
(52) U.S. Cl.
USPC ................. 345/179; 178/18.01; 178/19.01
(58) Field of Classification Search
USPC ................. 178/18.01–19.07; 345/173–178
See application file for complete search history.

(56) References Cited

U.S. PATENT DOCUMENTS

| 2002/0113779 A1 | 8/2002 | Itoh et al. |
| 2004/0150631 A1 | 8/2004 | Fleck et al. |
| 2009/0322695 A1 | 12/2009 | Cho et al. |

FOREIGN PATENT DOCUMENTS

| EP | 1574934 A1 | 9/2005 |
| EP | 1691261 A1 | 8/2006 |

OTHER PUBLICATIONS

Extended European Search Report dated Nov. 5, 2010, issued from the corresponding European patent application.
Office Action dated Jan. 30, 2012, issued from the corresponding European patent application No. 10162856.8.

*Primary Examiner* — Michael Pervan
(74) *Attorney, Agent, or Firm* — Geoffrey deKleine; Borden Ladner Gervais LLP (57) ABSTRACT

A method includes detecting, at a first time, a first touch associated with a first touch value that meets one of a first touch threshold and a second touch threshold, detecting, at a second time, a second touch associated with a second touch value that meets one of the first touch threshold and the second touch threshold, providing first tactile feedback at the first time, and providing second tactile feedback at the second time when the time period between the first time and the second time meets a time threshold.

32 Claims, 7 Drawing Sheets

METHOD OF PROVIDING TACTILE FEEDBACK AND ELECTRONIC DEVICE

FIELD OF TECHNOLOGY

The present disclosure relates to electronic devices, including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

The following describes an electronic device and a method of providing tactile feedback in response to touches on a touch-sensitive display of an electronic device. One or more instances of tactile feedback may be provided based on attributes of the touch. Providing tactile feedback may not be feasible or desirable at all times when tactile feedback may typically be provided, e.g., when a touch threshold is met. Methods of determining when to provide tactile feedback are described, including a method in a two-type tactile feedback system wherein one type of tactile feedback is provided while the other type of tactile feedback is not provided under some circumstances, e.g., not provided at all times. In another example, tactile feedback is provided based on the rate of touch detection, wherein tactile feedback is provided when time between touch characteristics, e.g., touch depression and touch release, meets a threshold and not provided otherwise. Methods of providing tactile feedback are disclosed, including, for example, when the threshold-meeting changes in a two touch values occur in a time period that does not meet a time threshold, providing a first tactile feedback, e.g., tactile feedback related to depression of a key of a keyboard or a switch, and when threshold-meeting changes in a two touch values occur in a time period that meets the time threshold, providing a second tactile feedback, e.g., tactile feedback related to release of the key of the keyboard or the switch. In this example, the second feedback, e.g., release-related feedback, is not provided in some circumstances, such as when such touches occur very close in time to each other.

For simplicity and clarity of illustration, reference numerals may be repeated among the figures to indicate corresponding or analogous elements. Numerous specific details are set forth to provide a thorough understanding of the embodiments described herein. The embodiments may be practiced without these specific details. In other instances, well-known methods, procedures, and components have not been described in detail so as not to obscure the embodiments described herein. The description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smart-phones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

Figure 1:
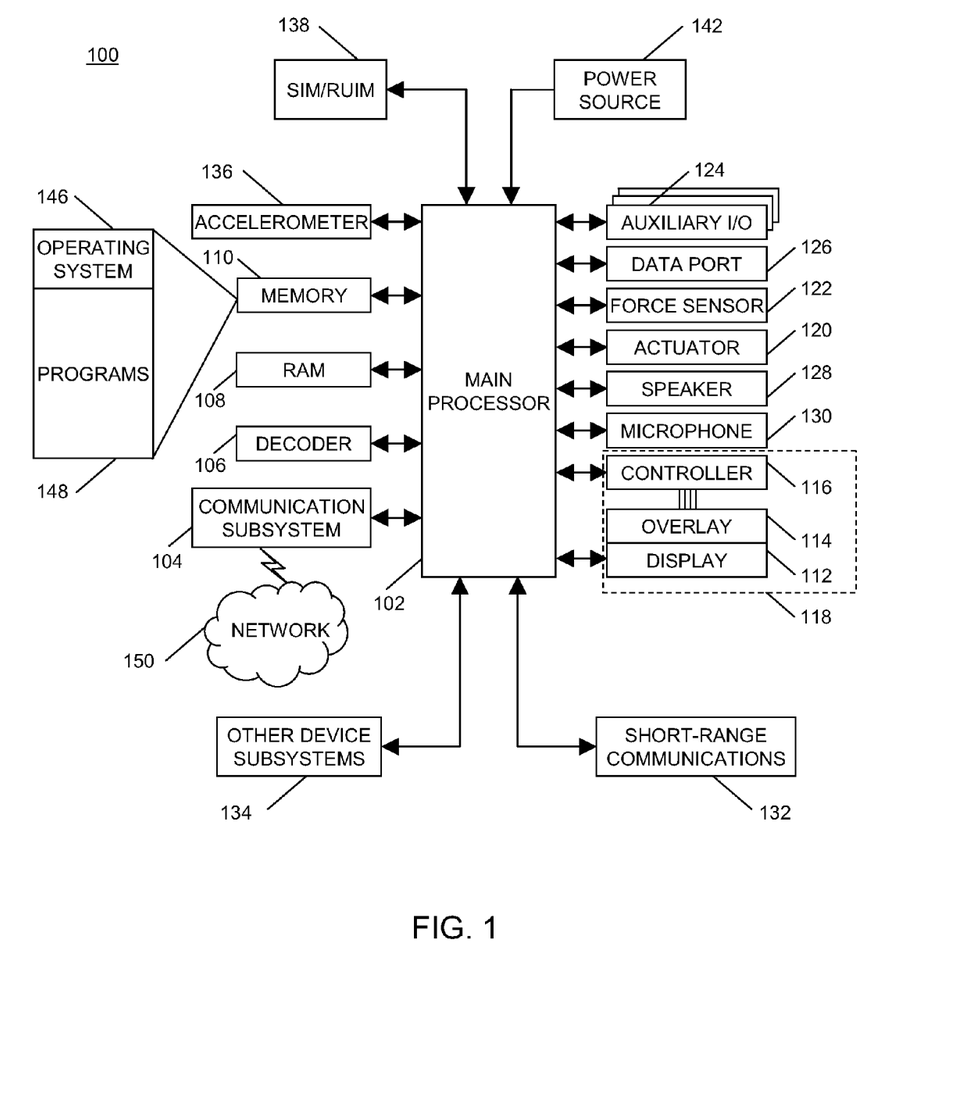
FIG. 1 is a block diagram of a portable electronic device in accordance with the present disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and dual-mode networks that support both voice and data communications. A power source 142, such as one or more rechargeable batteries or a port to another power supply, powers the portable electronic device 100.

The processor 102 interacts with other devices, such as a Random Access Memory (RAM) 108, memory 110, a display 112 with a touch-sensitive overlay 114 operably coupled to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, links, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into the memory 110.

The portable electronic device 100 also includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuator 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 provides the user with tactile feedback.

Figure 2:
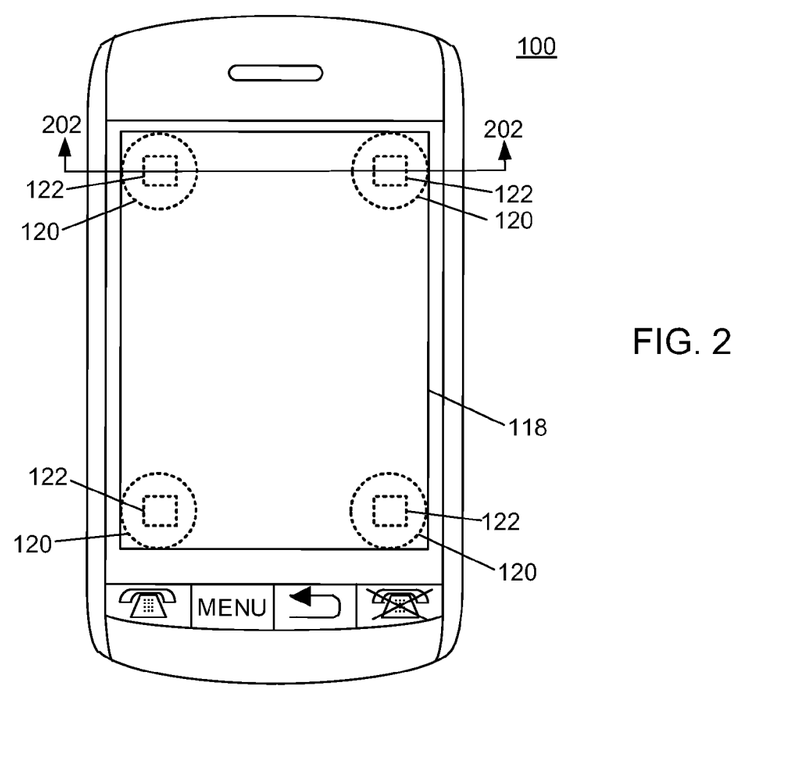
FIG. 2 illustrates a front view of a portable electronic device in accordance with the present disclosure.
Figure 3:
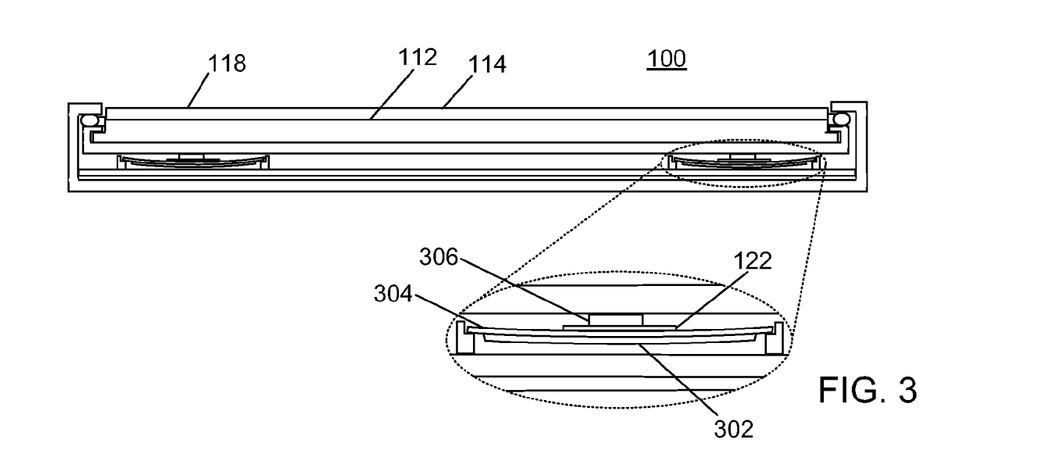
FIG. 3 illustrates a cross-sectional view through the line 202 of FIG. 2 in accordance with the present disclosure.

The actuator 120 may comprise one or more piezoelectric (piezo) actuators that provide tactile feedback. FIG. 2 is front view of an example of a portable electronic device 100. In the example shown in FIG. 2, the actuator 120 comprises four piezo actuators 120, each located near a respective corner of the touch-sensitive display 118. FIG. 3 is a sectional side view of the portable electronic device 100 through the line 202 of FIG. 2. Each piezo actuator 120 is supported within the portable electronic device 100 such that contraction of the piezo actuators 120 applies a force against the touch-sensitive display 118, opposing any force externally applied to the display 118. Each piezo actuator 120 includes a piezoelectric device 302, such as a piezoelectric disk adhered to a substrate 304 such as a metal substrate. An element 306 that is advantageously at least partially flexible and comprises, for example, hard rubber may be located between the disk 302 and the touch-sensitive display 118. The element 306 does not substantially dampen the force applied to or on the touch-sensitive display 118. In the example shown in FIG. 2 and FIG. 3, the force sensor 122 comprises four force-sensors 122 located between the element 306 and the substrate 304. The force sensors 122 are utilized to determine a value related to the force at each of the force sensors 122 when an external force is applied to the touch-sensitive display 118. The substrate 304 bends when the piezoelectric device 302 contracts diametrically due to build up of voltage/charge at the piezoelectric device 302 or in response to an external force applied to the touch-sensitive display 118. The voltage/charge may be adjusted by varying the applied voltage or current, thereby controlling the force applied by the piezo actuators 120 on the touch-sensitive display 118. The voltage/charge on the piezo actuators 120 may be removed by a controlled discharge current that causes the piezoelectric devices 302 to expand diametrically, decreasing the force applied by the piezo actuators 120 on the touch-sensitive display 118. Absent an external force applied to the touch-sensitive display 118 and absent a charge on the piezoelectric device 302, the piezo actuator 120 may be slightly bent due to a mechanical preload.

Figure 4:
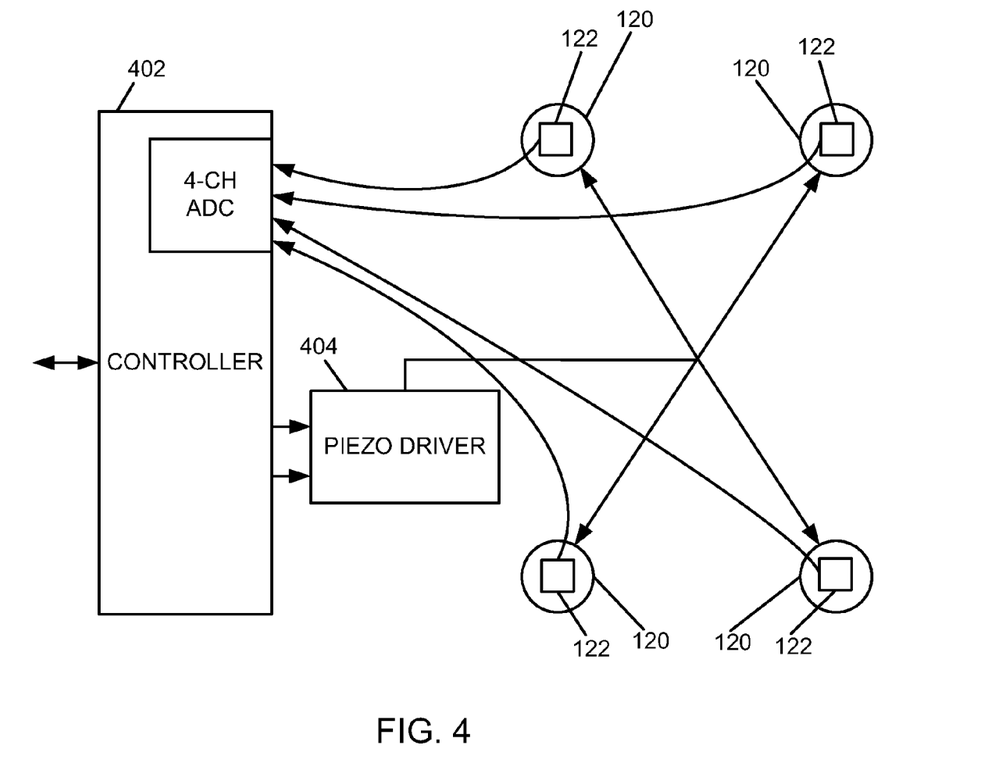
FIG. 4 is a block diagram showing components of the portable electronic device in accordance with the present disclosure.

A functional block diagram of components of the portable electronic device 100 is shown in FIG. 4. In this example, each force sensor 122 is coupled to a controller 402, which includes an amplifier and analog-to-digital converter (ADC). The force sensors 122 may be, for example, force sensing resistors in an electrical circuit such that the resistance changes with force applied to the force sensors 122. As force applied to the touch-sensitive display 118 increases, the resistance decreases. This change is determined, for example, via the controller 116 for each of the force sensors 122, and a value representative of the force at each of the force sensors 122 is determined.

The piezo actuators 120 are coupled to a piezo driver 404 that communicates with the controller 402. The controller 402 is also in communication with the main processor 102 of the portable electronic device 100 and may receive and provide signals to and from the main processor 102. The piezo actuators 120 and the force sensors 122 are operably coupled to the main processor 102 via the controller 402. The controller 402 controls the piezo driver 404 that controls the current/voltage to the piezoelectric devices 302, and thus controls the voltage/charge and the force applied by the piezo actuators 120 on the touch-sensitive display 118. Each of the piezoelectric devices 302 may be controlled substantially equally and concurrently. Optionally, the piezoelectric devices 302 may be controlled separately. In the example described below, the tactile feedback described simulates depression and release of a dome switch. Tactile feedback may simulate other switches, actuators, keys, and so forth. Non-simulated tactile feedback may be provided. For example, when a force applied on the touch-sensitive display 118 meets a depression threshold, the voltage/charge at the piezo actuators 120 is modified to impart a force on the touch-sensitive display 118 to simulate depression of a dome switch. In another example, when the force applied on the touch-sensitive display 118 meets a release threshold after the depression threshold is met, the voltage/charge at the piezo actuators 120 is modified to impart a force by the piezo actuators 120 to simulate release of a dome switch.

When a touch is detected on the touch-sensitive display, touch values associated with the touches are determined. A touch value may be a value of a characteristic or attribute of a touch, for example, a force imparted on the touch-sensitive display 118, a displacement distance of at least a part of the touch-sensitive display 118, an area of contact of a touch, a time duration of a touch, a number of successive taps at a location on the touch-sensitive display 118, and so forth, or any combination thereof.

A touch threshold is a value associated with a touch, and when a touch value meets the touch threshold, a function is performed. A value meets a threshold when the value is at or beyond the threshold. For example, when the touch threshold is a force value, the force threshold may reflect, for example, the force of a touch that actuates the actuator(s) 120 or a force measured or detected by a force sensor 122, which force may be interpreted by the processor 102 to meet the touch threshold. A touch threshold may be a single unit-less value that is a combination of two or more values related to the touch, e.g., duration and force. Multiple touch thresholds may be applicable for a touch, and different values of touch thresholds may be associated with different functions or input. Different touch thresholds may be associated with different touch characteristics.

Multiple threshold-meeting changes for simultaneous or near-simultaneous touches may occur within a very short period of time, for example, less than 15 ms. In such situations, tactile feedback for one of the threshold-meeting changes may be delayed as tactile feedback for another threshold-meeting change is provided. Tactile feedback in such situations may be confusing, or may not be received, for example, when touches end before the tactile feedback is provided. In other situations, providing tactile feedback may be difficult or impractical due to touch data processing delays or hardware constraints of the portable electronic device 100.

A method includes detecting, at a first time, a first touch associated with a first value that meets one of a first touch threshold and a second touch threshold; detecting, at a second time, a second touch associated with a first value that meets one of the first touch threshold and the second touch threshold; providing first tactile feedback at the first time; and providing second tactile feedback at the second time when the time period between the first time and the second time meets a time threshold.

The following describes examples of providing tactile feedback when multiple threshold-meeting changes occur for simultaneous or near-simultaneous touches, e.g., touches that occur within a very short period of time, such as 20 ms or less.

Figure 5:
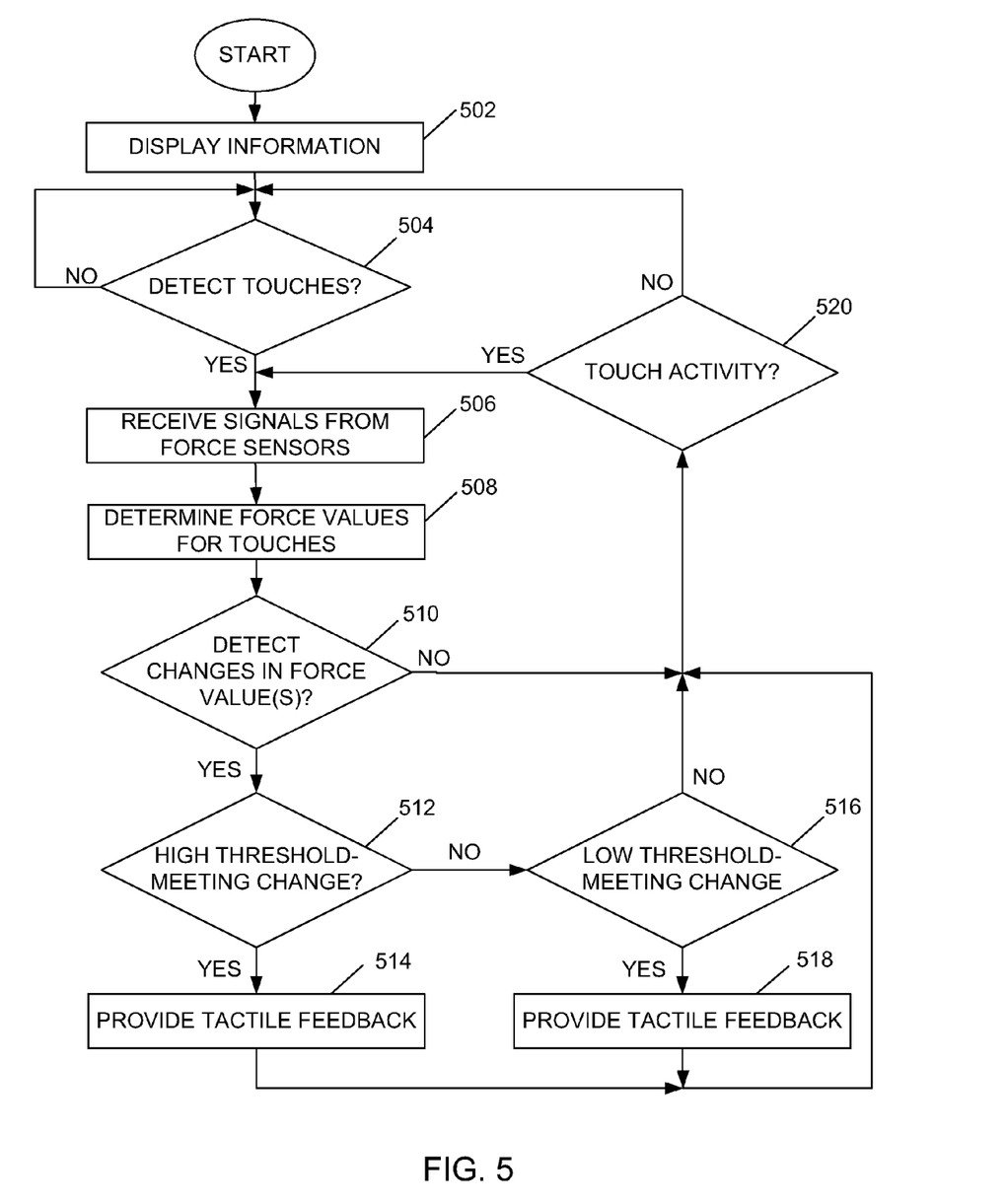
FIG. 5 is a flowchart illustrating a method of providing tactile feedback in accordance with the present disclosure.

A flowchart illustrating a method of controlling the electronic device 100 to provide tactile feedback is shown in FIG. 5. The method may be carried out by software executed by, for example, the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium. In the example of FIG. 5, the touch values comprise force values, and the tactile feedback comprises simulation of depression and release of a key or switch. Information is displayed 502 on the display 112. The information may be from an application, such as a web browser, contacts, email, calendar, music player, spreadsheet, word processing, operating system interface, and so forth.

When two touches are detected 504 on the touch-sensitive display 118, the touch locations are determined. In the example shown in the flowchart of FIG. 5, the touch value is a force value associated with the force imparted by a touch on the touch-sensitive display 118, and the touch threshold is a force threshold. The tactile feedback provided in this example simulates depression and release of a dome switch, i.e., two different types of tactile feedback are provided. Signals received 506 from the force sensors 122 are utilized to determine 508 force values associated with the touches. The force values associated with the touches may be determined based on the locations of the force sensors and the relative locations of the touches, utilizing, for example, a force balance. During a scan, the touch values, such as force values, associated with the touches are determined utilizing signals received from the touch sensors, such as force sensors. Scans are performed at regular intervals in time, e.g., 10 to 15 ms.

For a touch, a comparison is made between the force value associated with the touch determined at 508 and the previously determined force value associated with the touch, e.g., from the previous scan, to detect 510 any changes in the force value associated with the touches. When no change is detected 510 in the force values associated with the two touches from the previous scan to the current scan, the process continues at 520. When a change is detected 510 in a force value associated with a touch, a determination is made 512 whether the change in force value associated with the touch is a threshold-meeting change. A force value meets a threshold when the force value is at or beyond the threshold. When the force value associated with a touch meets a high touch threshold at 512, such as a depression threshold, when the force value associated with a touch from a previous scan did not meet the touch threshold, e.g., the depression threshold, tactile feedback is provided 514, and the process continues at 520. The tactile feedback may, for example, simulate depression of a switch, as described above. When the touch threshold is not met at 512, the process continues at 512.

When the force value associated with a touch meets a low touch threshold at 516, such as a release threshold, when a force value from a previous scan did not meet the touch threshold, e.g., the release threshold, tactile feedback is provided 518. The tactile feedback may, for example, simulate release of a switch. The process continues at 520.

Touch activity is detected at 520 when touch contact for one or both of the touches is maintained on the touch-sensitive display 118. When touch contact continues, the touch locations are determined and the process continues at 506. When both touches are discontinued, the process continues at 504.

Tactile feedback may be provided for only one of two touches when threshold-meeting changes in touch values are detected within a time threshold. The time threshold may be substantially the same as the interval of time between scans for or determinations of touch values. Alternatively, the time threshold may be a fixed or variable period of time, which may be selected or entered by a user. Tactile feedback may be provided for only one of the touches when threshold-meeting changes are detected within the time threshold for both touches. When the time between detecting a threshold-meeting change in touch value for one touch and detecting a threshold-meeting change in touch value for another touch meets the time threshold, tactile feedback for both threshold-meeting changes may be provided.

Figure 6:
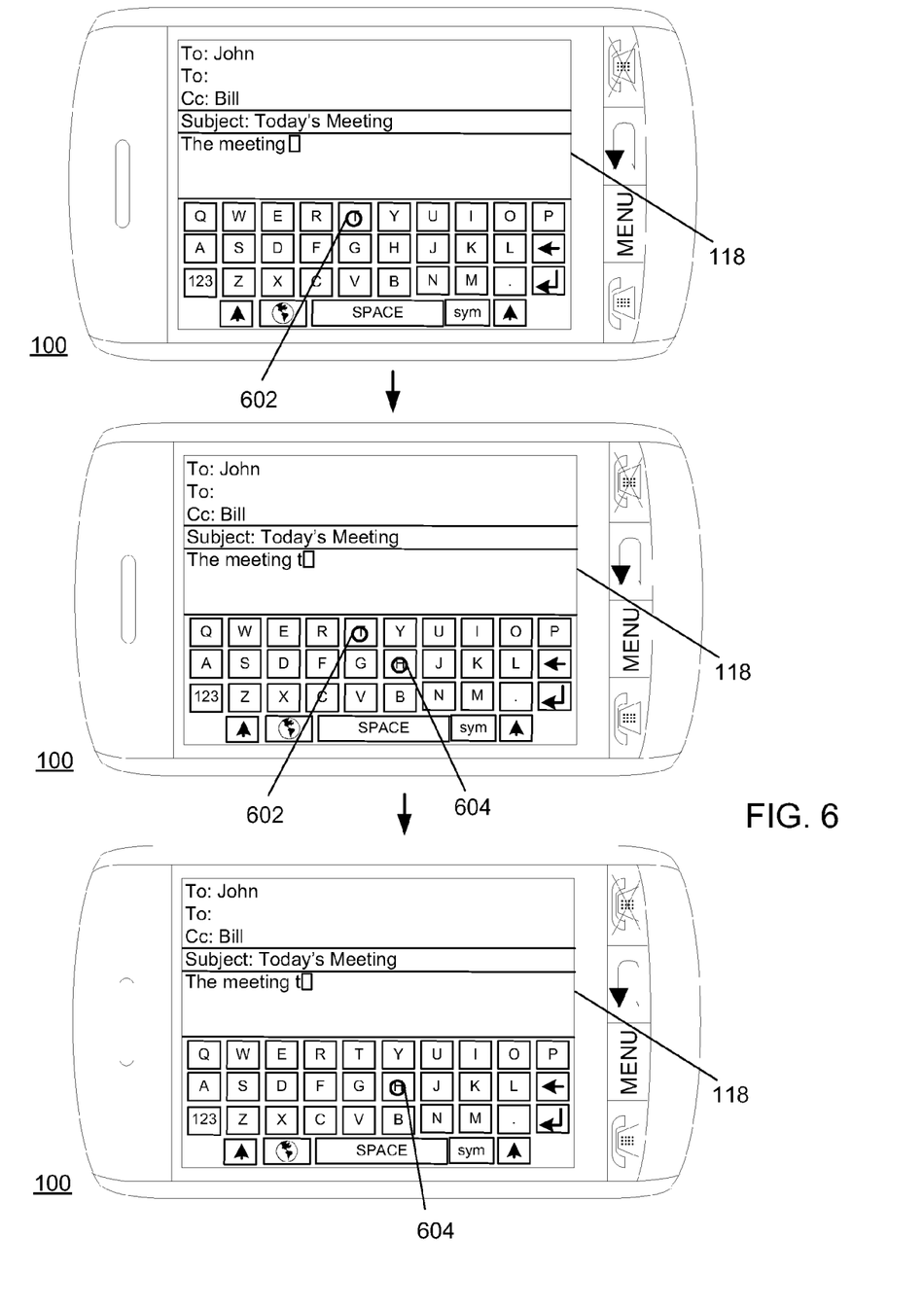
FIG. 6 illustrates examples of locations of touches on a touch-sensitive display of a portable electronic device in accordance with the present disclosure.

Examples of two touches on a touch-sensitive display 118 of a portable electronic device 100 are illustrated in FIG. 6. In the example of FIG. 6, a virtual keyboard is rendered on the touch-sensitive display 118, the touch values comprise force values, and the tactile feedback comprises simulation of depression and release of a key or switch. A touch is detected at a location 602 on the touch-sensitive display 118 that is associated with the letter "T" as shown in the upper illustration of FIG. 6. The values from the force sensors are utilized to determine a force value associated with the touch. In this example, the force value is determined to be a depression threshold-meeting change, and tactile feedback is provided that simulates depression of a switch utilizing the actuators 120. Another touch is detected at a location 604 on the touch-sensitive display 118 that is associated with the letter "H" as shown in the middle illustration of FIG. 6. The signals received from the force sensors 122 are utilized to determine force values for each of the touches 602, 604. At this time in the example, the force value associated with the "T" touch decreases to a value that meets the release threshold, and within a very short period of time, the force value associated with the "H" touch increases to a value that meets the depression threshold. The force value associated with the "H" touch is a depression threshold-meeting change and tactile feedback is provided that simulates depression of a switch utilizing the actuators 120. Tactile feedback is not provided in response to detecting the change in the force value associated with the "T" touch. The "T" touch ends without further tactile feedback.

The signals received from the force sensors 122 are utilized to determine the force value associated with the remaining touch at the "H" location 604 shown in the lower illustration of FIG. 6. The change in force value associated with the touch 604 is a release threshold-meeting change, and tactile feedback is provided that simulates release of a switch utilizing the actuators 120.

Figure 7:
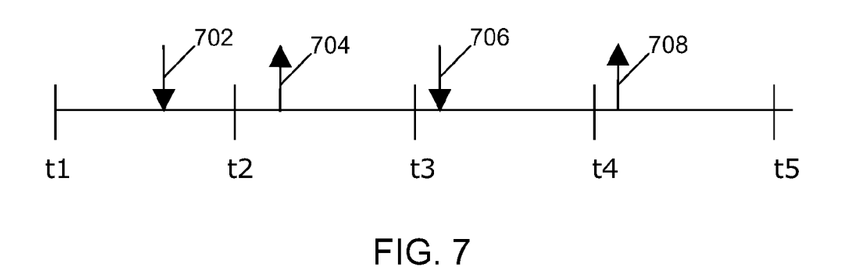
FIG. 7 and FIG. 8 illustrate examples of timing of touches on a touch-sensitive display of a portable electronic device in accordance with the present disclosure.
Figure 8:
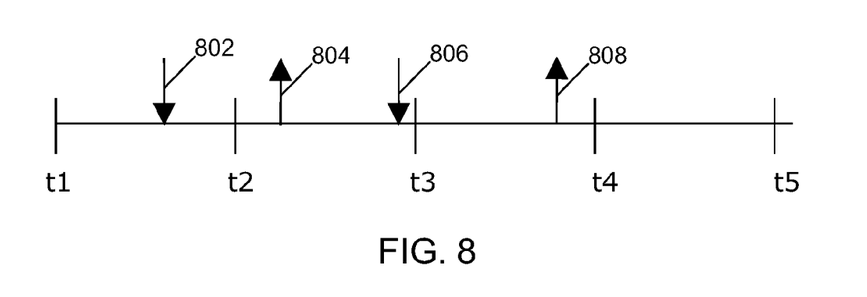

Examples of timing of touches on the touch-sensitive display 118 are shown in FIG. 7 and FIG. 8. In these examples, the touch values are force values, and the tactile feedback comprises simulation of depression and release of a key or switch. In the examples shown, the arrows directed toward the horizontal line represent a threshold-meeting change in force value from below the depression threshold to meet the depression threshold, for example, when a user depresses the touch-sensitive display 118. The arrows directed away from the horizontal line represent a threshold-meeting change in force value from not meeting the release threshold to meeting the release threshold, for example, when a user releases the touch-sensitive display 118 after depressing it. The points in time, t1, t2, t3, t4, and t5, represent the times at which signals are received from the force sensors 122, which points in time may be referred to as scan times. The time intervals between these points may be predetermined, e.g., fixed or variable based on a calculation, table look-up, or user entry.

As illustrated in FIG. 7, touch signals are received at t1, and no changes in force values are identified for two touches detected on the touch-sensitive display 118. Between t1 and t2, a force value associated with one of the two touches meets the depression threshold, as illustrated by the arrow 702. The change in force value is determined from the signals at t2, and tactile feedback is provided to simulate depression of a switch at t2. Between t2 and t3, a force value associated with the touch meets the release threshold, as illustrated by the arrow 704. The change in force value is determined from the signals at t3, and tactile feedback is provided to simulate release of a switch. Between t3 and t4, a force value associated with the other touch of the two touches meets the depression threshold, as illustrated by the arrow 706. The change in force value is determined from the signals at t4, and tactile feedback is provided to simulate depression of a switch. In the period of time between t4 and t5, a force value associated with the touch meets the release threshold, as illustrated by the arrow 708. The change in force value is determined from the signals at t5, and tactile feedback is provided to simulate release of a key or switch.

As illustrated in FIG. 8, touch signals are received at t1, and no changes in force values are identified for two touches detected on the touch-sensitive display 118. In the period of time between t1 and t2, a force value associated with one of the touches meets the depression threshold, as illustrated by the arrow 802. The change in force value is determined from the signals at t2, and tactile feedback is provided to simulate depression of a switch. In the period of time between t2 and t3, a force value associated with the touch meets the release threshold, as illustrated by the arrow 804, and a force value associated with the other touch meets the depression threshold, as illustrated by the arrow 806. The changes in force values are determined from the signals at t3. In response to determining the changes in force values, tactile feedback is provided to simulate depression of a switch. Tactile feedback is not provided to simulate release of a switch. In the period of time between t3 and t4, a force value associated with the other touch meets the release threshold, as illustrated by the arrow 708. The change in force value is determined from the signals received at t4, and tactile feedback is provided to simulate release of a switch.

A threshold-meeting change in a force value associated with a touch may be ignored, i.e., no tactile feedback is provided when another threshold-meeting change in force value is detected within a predetermined period of time. In the examples of FIG. 6, the predetermined period of time is the period of time between receiving signals from the force sensors 122, e.g., from a previous scan to the current scan. Optionally, the predetermined period of time may be a preset time or the time between a preset number of scans; a fixed period of time set by a user; a default time stored in the device; or a value based on the cumulative time between signals sent by the force sensors, time to determine the force values and changes in force values, and time to provide tactile feedback.

Reducing the number of instances of providing tactile feedback and, in particular, not providing tactile feedback for one of two threshold-meeting touches detected within a predetermined period of time, reduces confusing tactile feedback provided to the user of the device and decreases power consumption.

Figure 9:
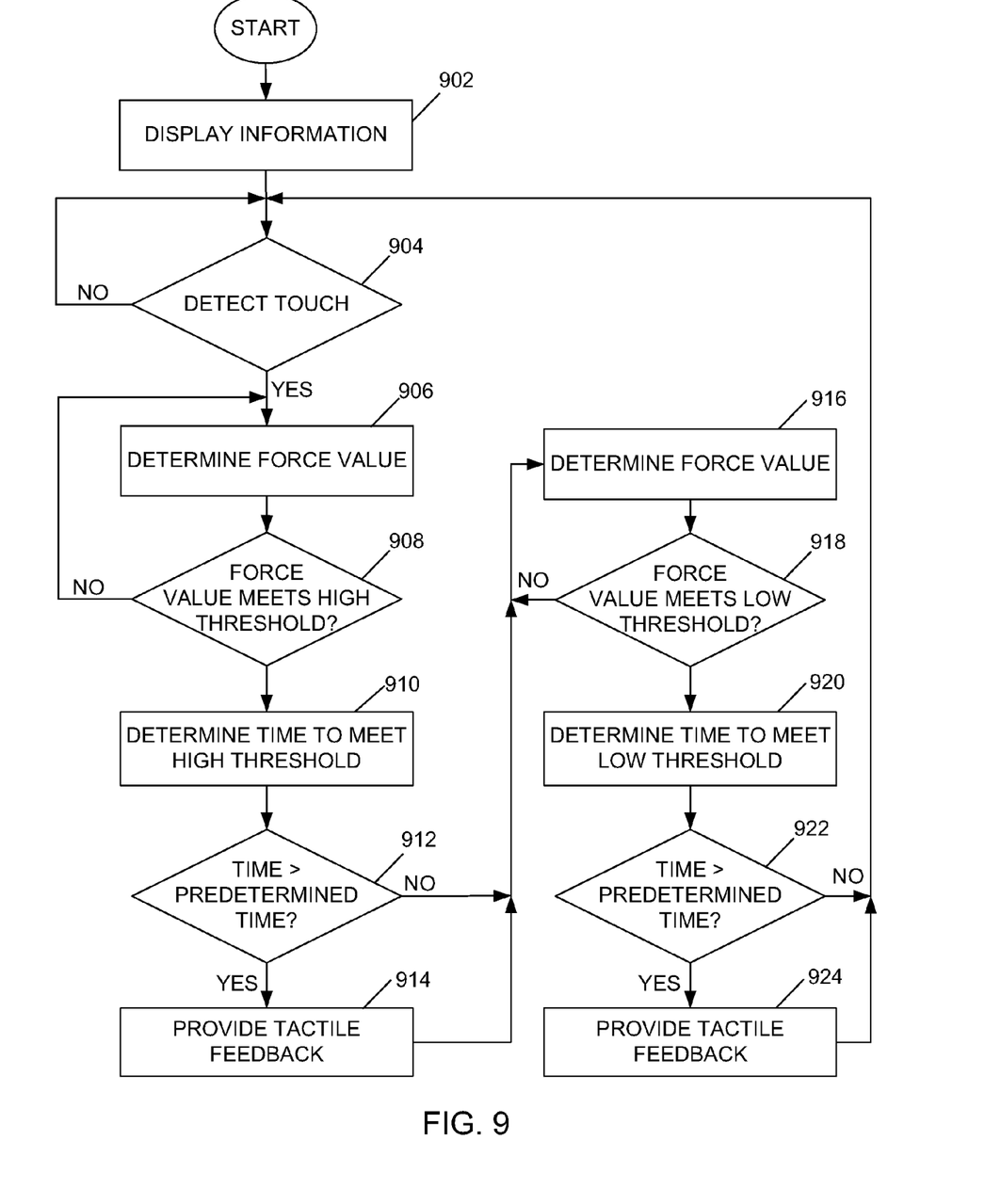
FIG. 9 illustrates a flowchart illustrating a method of providing tactile feedback in accordance with the present disclosure.

A flowchart illustrating another method of providing tactile feedback is shown in FIG. 9. The method may be carried out by software executed by, for example, the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium. In the example of FIG. 5, the touch values comprise force values, and the tactile feedback comprises simulation of depression and release of a key or switch. Information is displayed 902 on the display 112. The information may be from an application, such as a web browser, contacts, email, calendar, music player, spreadsheet, word processing, operating system interface, and so forth.

When a touch is detected 904 on the touch-sensitive display 118, the touch location is determined. The touch signals from the force sensors 122 are utilized to determine 906 a force value associated with the touch. A determination is made 908 whether the force value meets a high threshold, e.g., a depression threshold. As described above, a force value meets a threshold when the force value is at or beyond the threshold. When the force value does not meet the high threshold, the process continues at 906. When the force value meets the high threshold, the depression time is determined 910, which is the time between detecting the touch at 904 and determining that the force value meets the high or depression threshold at 908. The depression time is compared 912 to a predetermined time, and when the depression time is greater than the predetermined time, tactile feedback is provided 914. The tactile feedback may be the simulation of depression of a switch. When the depression time is not greater than the predetermined time, tactile feedback is not provided, and the process continues at 916.

The touch signals from the force sensors 122 are utilized to determine 916 a force value associated with the touch. A determination is made 918 whether the force value meets a low threshold, e.g., a release threshold. When the force value does not meet the low threshold, the process continues at 916. When the force value meets the low threshold, the release time is determined 920, which is the time between determining that the force value meets the high or depression threshold at 908 and determining that the force value meets the low or release threshold at 918. The release time is compared 922 to a predetermined time, and when the release time is greater than the predetermined time, tactile feedback is provided 924. The tactile feedback may be the simulation of release of a switch. When the release time is not greater than the predetermined time, tactile feedback is not provided.

Tactile feedback may not be provided where the threshold-meeting changes in force values occur very quickly. Rather than providing unnecessary and confusing tactile feedback after a selection has occurred and after a touch has ended, tactile feedback is not provided for a user typing very quickly. The changes in force values may be utilized to perform other functions and operations such as text entry. Reducing the tactile feedback provided, and, in particular, not providing at least some instances of tactile feedback, for example, for very quick touches, decreases power consumption. Utilizing any of the methods described herein provides a user with predictable tactile feedback.

Tactile feedback may comprise a single instance of tactile feedback, such as simulation of depression of a switch, when force values for multiple touches meet a touch threshold within a short period of time. Tactile feedback may comprise a single instance of tactile feedback, such as simulation of release of a switch, when force values for multiple touches change to meet the release threshold in a short period of time. Tactile feedback may alternatively comprise a single type of feedback, such as a pulse or vibration, rather than different types of feedback for different thresholds.

Tactile feedback may be provided at about the same time when a touch meets a touch threshold, e.g., when the touch value is determined to meet a touch threshold. Tactile feedback may be provided at other times. Tactile feedback is considered to be provided "at" a given time, e.g., during or after a scan associated with the given time, at about the same time, near, or within a short period of time that is associated with the given time, and so forth.

A method includes detecting at a first time a first touch associated with a first value that meets one of a first touch threshold and a second touch threshold, detecting at a second time a second touch associated with a first value that meets one of the first touch threshold and the second touch threshold, providing first tactile feedback at the first time, and providing second tactile feedback at the second time when the time period between the first time and the second time meets a time threshold.

An electronic device includes a touch-sensitive display, an actuator and at least one processor operably coupled to the touch-sensitive display and the actuator, and configured to detect at a first time a first touch associated with a first value that meets one of a first touch threshold and a second touch threshold, detect at a second time a second touch associated with a first value that meets one of the first touch threshold and the second touch threshold, provide first tactile feedback at the first time, and provide second tactile feedback at the second time when the time period between the first time and the second time meets a time threshold.

Another method may include detecting a first threshold-meeting change in a touch value associated with a first touch on a touch-sensitive display, detecting a second threshold-meeting change in a touch value associated with a second touch on the touch-sensitive display, when at least one of the first threshold-meeting change and the second threshold-meeting change is a change to meet a first touch value threshold, providing first tactile feedback, and when the first threshold-meeting change and the second threshold-meeting change are changes to meet a second touch-value threshold, providing second tactile feedback.

Another method may include detecting a first touch at a first time and a second touch at a second time on a touch-sensitive display, determining a first touch value associated with the first touch and a second touch value associated with the second touch, wherein the first touch value and the second touch value are threshold-meeting values, when the time between the first time and the second time meet a time threshold, providing first tactile feedback at the first time and second tactile feedback at the second time, and when the time between the first time and the second time does not meet a time threshold, providing the first tactile feedback at the first time.

Another method may include detecting a first touch and a second touch within a predetermined time period, wherein the first touch and the second touch meet at least one touch threshold, and providing first tactile feedback in response to the detecting, and detecting a third touch and a fourth touch separated by at least the predetermined time period, wherein the third touch and the fourth touch meet at least one touch threshold, and providing second tactile feedback in response to detecting the third touch and third tactile feedback in response to detecting the fourth touch.

Another method includes determining, in a first time period, a first touch value associated with a first touch on a touch-sensitive display and a first touch value associated with a second touch on the touch-sensitive display. In a second time period, a second touch value associated with the first touch and a second touch value associated with the second touch are determined. When a change from the first force value to the second force value associated with the first touch or the second touch results in one of the second force values meeting one of a first threshold and a second threshold: first tactile feedback is provided in response to detecting that at least one of the second force value associated with the first touch and the second force value associated with the second touch meets a first threshold, and second tactile feedback is provided when the second threshold is met by at least one of the second force value associated with the first touch and the second force value associated with the second touch, and neither the second force value associated with the first touch and the second force value associated with the second touch meets the first threshold.

A method includes detecting a touch on a touch-sensitive display, determining when a force value associated with the touch meets a first force threshold, determining a first period of time between detecting the touch when the force meets the first force threshold, and providing a first tactile feedback when the first period of time meets a first time threshold.

Another method includes detecting a touch on a touch-sensitive display, determining when a force value associated with the touch meets a second force threshold, after determining that the force value meets a first force threshold, determining a period of time between when the force value meets the first force threshold and when the force value meets the second force threshold, and providing second tactile feedback when the second period of time meets a second time threshold.

An electronic device includes a touch-sensitive, an actuator configured to provide tactile feedback, a force sensor configured to detect a force value applied to the touch-sensitive display. The electronic device also includes at least one processor operably coupled to the touch-sensitive display, the actuator, and the force sensor, and configured to determine when a force value associated with the touch meets a first threshold, determine a first period of time between detecting the touch and determining when the force value associated with the touch meets the first threshold, and provide a first tactile feedback in response to determining that the first period of time is greater than a first predetermined period of time.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   detecting, at a first time, a first touch associated with a first touch value that meets one of a first touch threshold and a second touch threshold;
   detecting, at a second time, a second touch associated with a second touch value that meets one of the first touch threshold and the second touch threshold, wherein the second touch is detected before the first touch is discontinued;
   providing first tactile feedback at the first time;
   providing second tactile feedback at the second time in response to determining that the time period between the first time and the second time meets a time threshold.

2. The method according to claim 1, comprising not providing the second tactile feedback in response to determining that the time period does not meet the time threshold.

3. The method according to claim 1, wherein the time threshold is substantially the same as a period of scanning for touch values.

4. The method according to claim 1, wherein the first tactile feedback and the second tactile feedback are different.

5. The method according to claim 1, wherein at least one of the first tactile feedback and the second tactile feedback comprise simulation of depression or release of a switch.

6. The method according to claim 1, wherein the first touch value comprises a force value.

7. The method according to claim 1, comprising determining touch values for the first and second touches at points of time separated by a time period substantially the same as the time threshold.

8. The method according to claim 1, wherein the time threshold comprises a fixed period of time.

9. A computer-readable storage device having computer-readable code executable by at least one processor of a portable electronic device to perform the method of claim 1.

10. The method according to claim 1, wherein the the first tactile feedback is provided in response to the first touch and the second tactile feedback is provided in response to the second touch.

11. An electronic device comprising:
   a touch-sensitive display;
   an actuator;
   at least one processor operably coupled to the touch-sensitive display and the actuator and configured to:
      detect, at a first time, a first touch associated with a first touch value that meets one of a first touch threshold and a second touch threshold;
      detect, at a second time, a second touch associated with a second touch value that meets one of the first touch threshold and the second touch threshold, wherein the second touch is detected before the first touch is discontinued;
      provide first tactile feedback at the first time;
      provide second tactile feedback at the second time in response to determining that the time period between the first time and the second time meets a time threshold.

12. The electronic device according to claim 11, wherein the processor is configured to not provide the second tactile feedback in response to determining that the time period does not meet the time threshold.

13. The electronic device according to claim 11, wherein the time threshold is substantially the same as a period of scanning for touch values.

14. The electronic device according to claim 11, wherein the first tactile feedback and the second tactile feedback are different.

15. The electronic device according to claim 11, wherein the actuator comprises at least one piezoelectric actuator.

16. The electronic device according to claim 11, wherein at least one of the first tactile feedback and the second tactile feedback comprise simulation of depression or release of a switch.

17. The electronic device according to claim 11, comprising one or more force sensors operably coupled to the processor, wherein at least one of the first touch value and the second touch value is a force value.

18. The electronic device according to claim 11, wherein the time threshold comprises a fixed period of time.

19. A method comprising:
   detecting a first threshold-meeting change in a touch value associated with a first touch on a touch-sensitive display;

detecting a second threshold-meeting change in a touch value associated with a second touch on the touch-sensitive display, wherein the second touch is detected before the first touch is discontinued;

in response to determining at least one of the first threshold-meeting change and the second threshold-meeting change is a change to meet a first touch value threshold, providing first tactile feedback;

in response to determining that the first threshold-meeting change and the second threshold-meeting change are changes that meet a second touch-value threshold, providing second tactile feedback.

20. The method according to claim 19, wherein the first threshold-meeting change and the second threshold-meeting change occur during a predetermined period of time.

21. The method according to claim 19, wherein at least one of the first tactile feedback and the second tactile feedback comprises simulation of depression or release of a switch.

22. The method according to claim 19, wherein in response to determining that the second threshold-meeting change occurs beyond a predetermined period of time of the first threshold-meeting change and is a change to meet a second touch value, the method comprises providing the second tactile feedback.

23. The method according to claim 19, wherein the touch value comprises a force value.

24. The method according to claim 19, wherein the first threshold-meeting change and the second threshold-meeting change occur during a predetermined period of time and wherein the predetermined period of time comprises a period of scanning.

25. The method according to claim 19, wherein the first threshold-meeting change and the second threshold-meeting change occur during a predetermined period of time and wherein the predetermined period of time comprises a fixed period of time.

26. The method according to claim 19, wherein the the first tactile feedback is provided in response to the first touch and the second tactile feedback is provided in response to the second touch.

27. A method comprising:
detecting a first touch at a first time and a second touch at a second time on a touch-sensitive display, wherein the second touch is detected before the first touch ends;

determining a first touch value associated with the first touch and a second touch value associated with the second touch, wherein the first touch value and the second touch value are threshold-meeting values;

when the time between the first time and the second time meet a time threshold, providing first tactile feedback at the first time and second tactile feedback at the second time;

when the time between the first time and the second time does not meet a time threshold, providing the first tactile feedback at the first time and not providing the second tactile feedback.

28. The method according to claim 27, wherein the time threshold is substantially the same as a period of scanning.

29. The method according to claim 27, wherein the time threshold is a fixed period of time.

30. A method comprising:
detecting a first touch and a second touch within a predetermined time period, wherein the first touch meets at least one touch threshold and the second touch meets the at least one touch threshold, providing first tactile feedback in response to detecting the first touch, and not providing second tactile feedback in response to the second touch;

detecting a third touch and a fourth touch separated by at least the predetermined time period, wherein the third touch meets the at least one touch threshold and the fourth touch meets the at least one touch threshold, and providing second tactile feedback in response to detecting the third touch and third tactile feedback in response to detecting the fourth touch.

31. The method according to claim 30, wherein no touch is detected between the third touch and the fourth touch.

32. The method according to claim 30, wherein the first tactile feedback and the second tactile feedback are different than the third tactile feedback.

\* \* \* \* \*